United States Patent Office 3,232,272
Patented Feb. 1, 1966

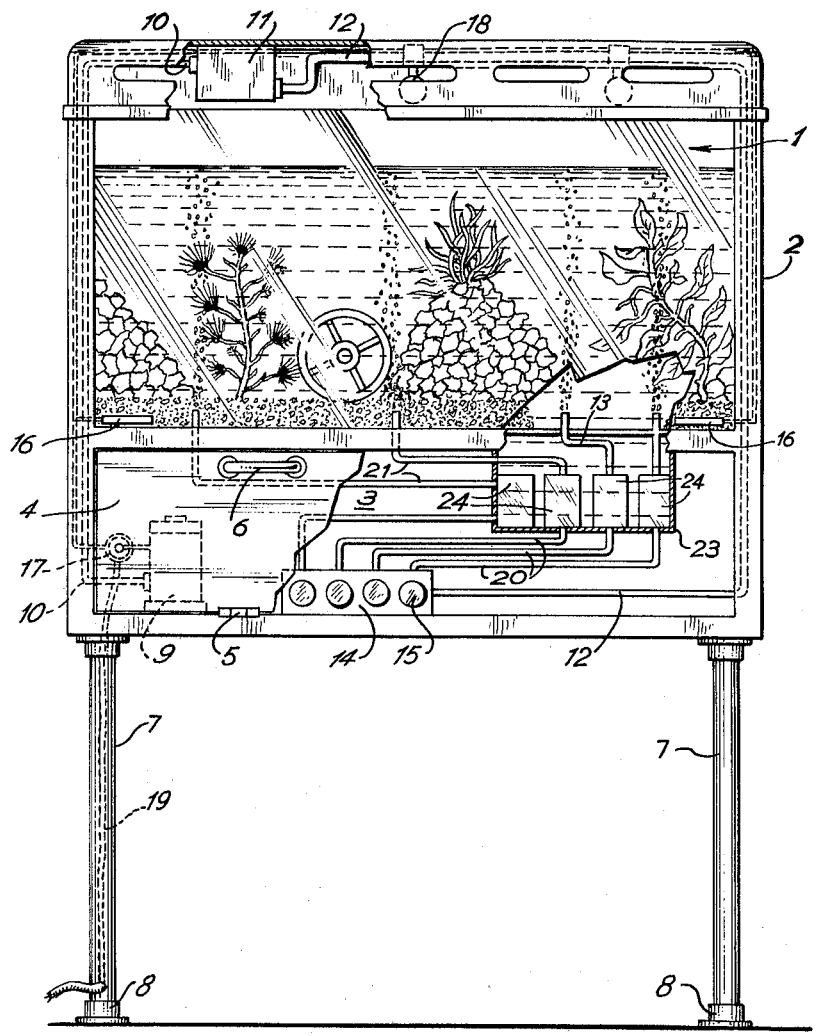

3,232,272
UNITARY INTEGRAL AQUARIUM
Guadalupe Dosamantes de José and Ana Maria Dosamantes de Garcia, both of Comonfort 15-9, Mexico City, Mexico
Filed Sept. 11, 1964, Ser. No. 395,766
Claims priority, application Mexico, Jan. 31, 1964, 75,654; Aug. 7, 1964, 78,412
4 Claims. (Cl. 119—5)

The present invention refers to an integral unitary aquarium, and more particularly it is related to improvements in aquariums of the household type. The invention, however, is not limited to the application of said aquariums to household use, but also to be applied for public display.

As it is well known, aquariums of the type referred to in the present application, generally comprise a tank provided with at least one or more transparent walls, so that the inhabitants of said tank or vessel, can be observed from the exterior, and it is also well known that, in order to maintain in good condition both the aquarium and its occupants, it is a must to maintain a constant air stream in the water contained in the aquarium, in order that the water will be sufficiently oxigenated for the breathing of the occupants of said aquarium and for the natural performance of all biological processes which might take place in said vessel.

It is also necessary, depending on the type of occupants to be found within the aquarium, to maintain water at a more or less constant temperature, if good results are to be obtained. As is conventional, it is customary to provide aquariums with a suitable lighting for the observation of the interior thereof, which lighting is used in some cases also for ornamental purposes, in order to add beauty to the aquarium.

In order to achieve the above goals, it is generally relied upon the installation of ducts through which air passes to be bubbled into the water of the aquarium, and which are quite visible and preclude the observation of the inhabitants thereof, and such air must be drawn, of course, by means of one or more pumps, in order to pass through the ducts, valves, filters and the great amount of equipment and fixtures which are generally bulky or which require very specialized installations, whereby a great difficulty is generally encountered in that said installations cannot be concealed, and thus the resulting appearance of the conventionally known aquariums is badly damaged, because the accessories are not properly concealed.

Of course that in order to conceal said accessories, very difficult operations must be effected, and hereinbefore it has been customary to insert through the top of the tank the ducts for bubbling air or the hoses for its connection to decorative figures which are placed within the aquariums, such as small divers, crustaceans, or movable wheels and the like. Also, the heaters and corresponding thermostats for controlling said heaters, are generally immersed, suspended from the top of the aquarium, so that a great deal of the attractiveness and good appearance of the aquarium as a whole is spoiled, and the installation thereof is made difficult, this being one of the main reasons why aquariums have not been popularized in the degree which they might with the attractiveness and beauty they represent for most of the people.

The present invention relates to specific improvements in an aquarium and has as the main object to provide an improved integral unitary aquarium, wherein it will not be necessary but to connect an electrical plug to a common receptacle, in order to make all the units of the aquarium work.

It is another object of the present invention, to provide an aquarium of the above mentioned character, wherein a great variety of effects can be achieved, by the simple handling of a few control buttons, at the will of the user, and which buttons are completely concealed to the sight of the spectator.

It is a further object of the present invention, to provide an improved aquarium of the above described character, which will also be provided with the advantage that all the elements for its operation are completely concealed, without detriment of the whole appearance of the assembly.

It is an additional object of the present invention, to provide an improved aquarium of the above mentioned character, which is also provided with safety devices for the operative elements thereof, which will insure that the delicate elements such as pumps and the like, will not suffer any damage even when one or more of the usual operating devices installed in the assembly, will not work eventually.

Another object of the present invention is to provide an improved aquarium which will have the above mentioned advantages, and in which the use of complicated valves is avoided, such as check valves or the like, to avoid entrance of water to the pneumatic system by very simple means which are exempt of mobile members.

The above and other objects and advantages of the present invention, will be more apparent from the following detailed specification of a preferred embodiment of an improved unitary integral aquarium, built according to the present invention, when said specification is taken in connection with the accompanying drawing wherein:

The single figure represents a front elevational view of a preferred embodiment of an improved unitary integral aquarium built according with the teachings of the present invention.

Having now more particular reference to the drawing, a front elevational view of a preferred embodiment of improved unitary aquarium built in accordance with the teachings of the invention is shown, and said aquarium comprises a general vessel 1, which in this illustrative case can be a glass vessel or can be built of any other suitable transparent material, and is formed by a plurality of transparent walls mounted, in such a way that water leaks will be avoided towards the exterior, by conventional processes, well known to those skilled in the art, on an outer frame 2, comprised of metallic members which define a vessel adopting the general form of a prismatic box, said frame 2 projecting downwardly from the bottom of the aquarium, in order to define a lower cavity 3, which is completely closed at three sides thereof by means of metallic covers or of any other suitable opaque material, having an attractive appearance, and the remaining or frontal face thereof being closed by means of a hinged cover 4 attached by means of hinges 5 to the lower part of the frame, and which cover 4 is provided, in the present embodiment, with a handle 6 for effecting an easy opening and closure thereof.

The outer assembly of the aquarium of the present invention is completed by a plurality of tubular legs 7, which are provided at the lower end thereof with supports or bases 8, of any conventional type, and which legs are hollow in order to introduce thereinto all the necessary electrical connections for the efficient operation of the air pumping equipment which is installed within cavity 3 under the transparent tank.

At the interior of cavity 3, a compressor pump 9 is arranged to provide air through a duct 10, which is projected outwardly through one of the members of the frame, in order to conceal it completely from the exterior, and up to the top of the aquarium, wherein the metallic cover of the device is arranged, wherein the lighting equipment 18 is installed, in order that this duct will enter into a safety box 11, penetrating one of its sides at the upper corner of said box 11, in order to provide a safety device as will be more fully described hereinbelow. From the safety box 11, the opposite side is provided with an outlet duct 12 for air, connected to the lower corner of said box 11, which duct is projected downwardly, either through the same structural member where the duct 10 was projected outwardly, or through the opposite structural member, at the will of the manufacturer, in order to conduct the air downwardly, and completely concealed from the exterior, down to cavity 3, where all the operational equipment is installed, to carry air to a valve system 14, which is provided with a plurality of knobs 15 to operate each one of said valves, and which constitutes in its structural assembly a manifold for the effective distribution of air to the several filters 24, according to the following more detailed description.

The water filters 24 are located within a depression 23 in the bottom of the aquarium, and is a part of or directly communicates with the transparent vessel 1, and are connected by ducts 20, which individually lead from each one of said valves 15, to communicate each of said valves with a filter 24, through any one of the walls or bottom of said depression, and thus filtering the water pushed by means of individual streams of air, to be thereafter used to act upon several accessories within the aquarium such as can be clearly seen in the illustrative embodiment of the figure, wherein the outlet of said filters again trespasses the wall of the bottom of the depression, to pass by means of ducts 21 to bubble within the water of vessel 1 and move, for example, wheel 22, or simply bubble in order to provide the necessary oxygen for the biological functions of all the inhabitants of the aquarium.

A set of outlet pipes 13 from filters 24 can be arranged to pass directly upwards from the depressed bottom, in order to direct bubble air towards tank 1 through the water contained therein, for the good performance of all the referred to equipment.

Also, on the bottom of the aquarium, that is, on the bottom which is visible from the exterior, heaters 16 are arranged, which can be conveniently concealed by the pebbles, which is customary to place at the bottom of the aquarium.

Thermostat 17 is also present in order to control, in the aquarium of the present invention, the operation of heater 16 and, finally, in accordance to the above described characteristics, on the top cover of the aquarium, a set of lamps 18 can be arranged, having a suitable structure to remain completely concealed within cover 10, in order to provide for the general lighting of the aquarium.

The motorpump 9, as well as all other electrical devices of the aquarium, are fed with electric power supplied to proper lead wires 19, which will pass concealed through legs 7, which, as above indicated, are hollow in all their length, and can serve therefore as ducts for the above mentioned objectives, and said lead-in wire 19 leads to the exterior from the lower end of said leg, to continue therefrom, in any desired length, to an end where a conventional plug is arranged in order to be capable of insertion in any common electrical receptacle device.

Lead wire 19, as indicated, not only feeds motorpump 9, but also, and by means of branches and projections thereof, it feeds all other electrical devices such as heater 16, lamps 18 and thermostat 17, and it is a characteristic of the present invention that said branches and said lead wire, arranged to feed said accessories, run in a completely concealed form, within the members forming the frame, and to the interior of cavity 3, with said members being of tubular nature; or otherwise concealed in any conventional manner within the above mentioned structural members.

As can be clearly seen from the single figure accompanying the present specification, the safety box 11, being located at a level higher than the level of the water within vessel 1, completely cuts the siphon effect which might occur when the motor pump 9 stops, inasmuch as the entrance of water through the air ducts 13 or 21, might make said water to come back, first pushing it upwardly through duct 12, to then permit it to go downwardly through duct 10, whereby causing flooding of the pneumatic system, but inasmuch as said chamber or safety box 11 has been interposed in said system, the siphon effect will be completely cut or broken, and the chamber of safety box 11, has according to the present invention, enough capacity to accommodate all the liquid which might reach by inertia, to the top of the aquarium.

While the present invention has been described in connection with a preferred embodiment thereof, it will be obvious to anyone skilled in the art, that many variations and modifications can be effected in said embodiment, for instance, the electric power supply can be conducted not necessarily through a hollow leg of the aquarium, but instead, using to conceal the corresponding lead wire any ornament, structural member or the like, which might be suitable for this purpose, and some elements can be modified, such as the cover of the aquarium, which can be made in two parts, one of them fastened to the top of the aquarium, and serving as a support for the lighting tubes, and the other one hinged to the first portion by means of hinges or any other type of movable fastener, in order to allow upward motion to open it for any purpose. Therefore, it is to be understood that all those variations and modifications which will fall within the true spirit and scope of the present invention, are to be considered as contained within the scope of the invention, which is only to be limited by the contents of the accompanying claims.

Having thus described our invention, what we consider as a novelty and desire to secure by Letters Patent, is:

1. An aquarium comprising a transparent vessel for containing water, ornamental devices and aquatic inhabitants, an opaque cover above said vessel, an opaque chamber below said vessel, an opaque frame surrounding the vessel, cover and opaque chamber and supported on hollow legs, said frame and legs enclosing and concealing electrical connections and ducts for air to be bubbled through water in said transparent vessel, an air pump in said lower opaque chamber, a manifold in said lower chamber having valves to distribute air, said transparent vessel having a recess in its bottom which depends into said opaque chamber, a plurality of water filters located within said recess, safety means located within said cover above the transparent vessel and at a level which is higher than the maximum level to which water in the said vessel can reach to prevent water from going back towards the air pump when it is inadvertently stopped, and duct means connecting said pump to said safety means, said manifold and water filters in turn and passing through the lower part of said recess to the water filters therein.

2. An aquarium according to claim 1, wherein said safety means comprise an empty box, connected at one of the sides thereof by means of a first duct leaving said box from the upper portion thereof and passing within said frame to the pump which is in the lower opaque chamber, said box being connected to said manifold and valves by means of a second duct leaving said safety box from the opposite end and from the lower portion thereof and also passing within said frame, whereby if the pump is inadvertently stopped, water which might enter the second duct will be able to reach by inertia at most to said safety box which completely breaks any possible siphon effect, thus preventing the water from passing to the pump.

3. An aquarium according to claim 2, wherein said safety box is of a suitable volumetric capacity to contain all the amount of water which might reach the same when pushed upwardly by inertia, so that the level of the water in said box will never reach to the level of said first duct connecting said box with the pump.

4. An aquarium according to claim 1, wherein said recess in the bottom of the transparent vessel is provided with a plurality of openings in its wall, said openings being provided with packings surrounding said air duct means from the manifold connected to the inlet ends of said filters, said recess being provided with another plurality of openings in its walls to accommodate outlet air ducts from the outlet end of said filters, all of said inlet and outlet air ducts being arranged within the lower, opaque chamber for concealment, certain of said outlet ducts being introduced through corresponding openings in the bottom of the transparent vessel and having packings thereabout so that air and water from said filters may bubble upwardly through said transparent vessel.

References Cited by the Examiner

UNITED STATES PATENTS

| | | | |
|---|---|---|---|
| 164,074 | 6/1875 | Chase | 119—5 |
| 1,162,422 | 11/1915 | Wenig | 119—5 |
| 1,227,732 | 5/1917 | Zistel | 119—5 |
| 1,939,583 | 12/1933 | Welshausen | 119—5 |
| 2,424,879 | 7/1947 | Dach | 55—319 |
| 2,732,341 | 1/1956 | Huff | 119—5 X |
| 2,776,642 | 1/1957 | Sepersky | 119—5 |
| 3,146,195 | 8/1964 | Berardi | 119—5 |

SAMUEL KOREN, *Primary Examiner.*

ALDRICH F. MEDBERY, *Examiner.*